United States Patent
Wang (10) Patent No.: US 11,645,553 B2
(45) Date of Patent: May 9, 2023

(54) SYSTEM FOR PROCESSING BRAINWAVE SIGNALS, COMPUTING DEVICE, AND COMPUTER-READABLE STORAGE MEDIUM

(71) Applicant: Shanghai Yixue Education Technology Co., Ltd., Shanghai (CN)

(72) Inventor: Xin Wang, Shanghai (CN)

(73) Assignee: SHANGHAI YIXUE EDUCATION TECHNOLOGY CO., LTD., Shanghai (CN)

( * ) Notice: Subject to any disclaimer, the term of this patent is extended or adjusted under 35 U.S.C. 154(b) by 285 days.

(21) Appl. No.: 15/930,356

(22) Filed: May 12, 2020

(65) Prior Publication Data
US 2021/0357774 A1    Nov. 18, 2021

(51) Int. Cl.
*G06N 5/04* (2006.01)
*G06F 3/01* (2006.01)
*G06N 20/00* (2019.01)

(52) U.S. Cl.
CPC ............ *G06N 5/04* (2013.01); *G06F 3/015* (2013.01); *G06N 20/00* (2019.01)

(58) Field of Classification Search
CPC ........... G06N 5/04; G06N 20/00; G06F 3/015
USPC ............................................. 706/12; 345/174
See application file for complete search history.

(56) References Cited

U.S. PATENT DOCUMENTS

| 10,706,732 B1 * | 7/2020 | Hall | G09B 5/00 |
| 2010/0205541 A1 * | 8/2010 | Rapaport | G06Q 10/10 715/753 |
| 2019/0223783 A1 * | 7/2019 | Nakae | A61B 5/4824 |
| 2019/0387998 A1 * | 12/2019 | Garten | A61B 5/165 |

FOREIGN PATENT DOCUMENTS

| CN | 101932988 A | 12/2010 |
| CN | 105929966 A | 9/2016 |
| CN | 105962929 A | 9/2016 |
| WO | WO 2018/122868 A1 | 7/2018 |

OTHER PUBLICATIONS

Heraz, Using Machine Learning to Predict Learner Emotional State from Brainwaves, HERON Laboratory, Computer Science Dept., Univ. of Montreal, 2007, 5 pgs.

* cited by examiner

*Primary Examiner* — Calvin C Ma
(74) *Attorney, Agent, or Firm* — Morgan, Lewis & Bockius LLP (57) ABSTRACT

A system for processing brainwave signals, a computing device, and a non-transitory computer-readable storage medium are provided. The system includes a first computing device including at least one processor and a memory storing instructions, and a brainwave sensor in communication with the first computing device. The instructions, in response to execution by the at least one processor, cause the first computing device to perform operations including: acquiring brainwave signals of a user collected by the brainwave sensor within a duration in which the user is viewing a first content item; preprocessing the acquired brainwave signals; initiating transmission of the preprocessed brainwave signals to a second computing device; and receiving, from the second computing device, content item recommendation information obtained by the second computing device analyzing the preprocessed brainwave signals.

18 Claims, 5 Drawing Sheets

SYSTEM FOR PROCESSING BRAINWAVE SIGNALS, COMPUTING DEVICE, AND COMPUTER-READABLE STORAGE MEDIUM

TECHNICAL FIELD

The present disclosure relates to the field of artificial intelligence (AI) technology, and more particularly, to a system for processing brainwave signals, a computing device, and a non-transitory computer-readable storage medium.

BACKGROUND

AI technology has found wide applications in various industries such as medical treatment, education, security monitoring, etc. Among them, adaptive learning systems have attracted attention in the field of education. The adaptive learning system is a teaching assistant technology premised on the concept that the learning content should adapt to each user. The adaptive learning system recommends learning content suitable for the user by analyzing the feedback from the user and the historical learning condition of the user.

Currently, the adaptive learning system typically operates based on feedback information provided by the user through a user interface. Such feedback information may suffer from distortion or cheating, resulting in a deviation between the system output and the actual condition of the user. As a result, there is a need to improve the adaptive learning system.

SUMMARY

Embodiments of the present disclosure provide a system for processing brainwave signals. The system includes a first computing device including at least one processor and a memory storing instructions, and a brainwave sensor in communication with the first computing device. The instructions, in response to execution by the at least one processor, cause the at least one processor to perform operations including: acquiring brainwave signals of a user collected by the brainwave sensor within a duration in which the user is viewing a first content item; preprocessing the acquired brainwave signals; initiating transmission of the preprocessed brainwave signals to a second computing device; and receiving, from the second computing device, content item recommendation information obtained by the second computing device analyzing the preprocessed brainwave signals.

In some embodiments, the content item recommendation information includes a first indication of the user's proficiency in the first content item and a second indication of a second content item as a recommendation to the user.

Embodiments of the present disclosure provide a computing device. The computing device includes at least one processor, and a memory storing instructions executable by the at least one processor. The instructions include: instructions to extract, from brainwave signals received from a further computing device, brainwave data corresponding to a selected time period; instructions to determine, from the brainwave data, a brainwave state value indicative of user's brain activeness during the evaluation; and instructions to determine the content item recommendation information based, at least in part, on the brainwave state value and the first content item.

In some embodiments, the brainwave signals are collected by a brainwave sensor associated with the further computing device within a duration in which a user is viewing a first content item, and the selected time period is defined by a start time at which the computing device initiates evaluation of the user's proficiency in the first content item and an end time at which the further computing device initiates completion of the evaluation. The content item recommendation information includes a first indication of the user's proficiency in the first content item and a second indication of a second content item as a recommendation to the user.

Embodiments of the present disclosure provide a non-transitory computer-readable storage medium having stored thereon instructions that, when executed by at least one processor of a computing system, cause the computing system to perform operations. The operations include: acquiring brainwave signals of a user collected by a brainwave sensor within a duration in which the user is viewing a first content item; preprocessing the acquired brainwave signals; initiating transmission of the preprocessed brainwave signals to a second computing device; and receiving, from the second computing device, content item recommendation information obtained by the second computing device analyzing the preprocessed brainwave signals.

In some embodiments, the content item recommendation information includes a first indication of the user's proficiency in the first content item and a second indication of a second content item as a recommendation to the user.

BRIEF DESCRIPTION OF THE DRAWINGS

The accompanying drawings herein are incorporated in and become parts of the specification, illustrate embodiments consistent with the disclosure and, together with the description, serve to explain the principles of the disclosure. The embodiments described herein are for illustrative purposes only, and do not limit the scope of the present disclosure. In the drawings, the same reference numerals refer to similar but not necessarily identical elements.

DETAILED DESCRIPTION

In embodiments of the present disclosure, unless otherwise stated, terms such as "first" and "second", are used herein for differentiating one element from another element, and are not intended to limit the positional relationship, timing relationship or importance relationship of the elements. In some examples, a first element and a second element may refer to the same instance of the element, and in some cases, the first element and the second element may refer to different instances, based on the contextual description.

The terms used in the description of various embodiments of the present disclosure are for the purpose of describing a particular example only, and are not intended to limit the present disclosure. Unless the context clearly indicates otherwise, if the number of elements is not specifically limited, there may be one or more elements. Moreover, the term "and/or" as used herein is intended to cover any and all possible combinations of the listed items.

Current adaptive learning systems typically operate based on feedback information provided by the user through a user interface, without taking into account the user's physiological characteristics (such as brainwave information). Since the user may think subjectively when providing the feedback information through the user interface, or the feedback information may be provided by other users, the feedback information submitted to the adaptive learning system may not reflect the user's real condition, resulting in unsuitable learning content recommended to the user.

The inventor realized that brainwave signals can reflect the activity of the user's brain more directly than the interaction through the user interface. By introducing the user's brainwave signals, the input data provided to the adaptive learning system can truly and accurately reflect the user's current learning state. This can lead to improved accuracy of the adaptive learning system and thus recommended content items that are more suitable for the user, thereby improving the user experience.

Embodiments of the present disclosure will be described in detail below with reference to the accompanying drawings.

Figure 1A:
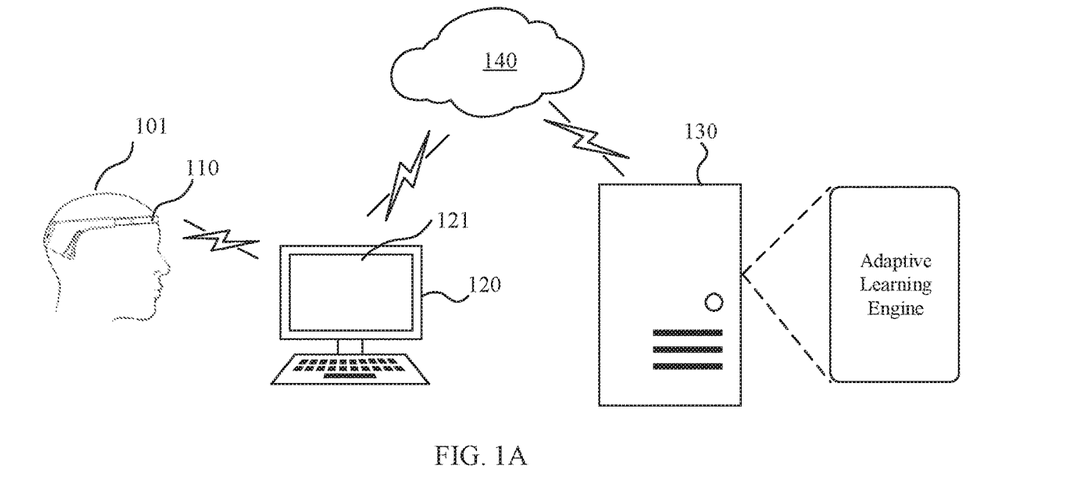
FIG. 1A is a schematic diagram illustrating an exemplary environment in which various technologies described herein can be implemented according to some exemplary embodiments of the present disclosure.

FIG. 1A is a schematic diagram illustrating an exemplary environment 100A in which various technologies described herein can be implemented according to some exemplary embodiments of the present disclosure. As illustrated in FIG. 1A, the environment 100A includes a user 101, a brainwave sensor 110, a first computing device 120, a second computing device 130, and a network 140.

In the scenario illustrated in FIG. 1A, the user 101 may be a student participating in one-to-one tutoring. When under test of the proficiency in a knowledge item, the student 101 may wear a brainwave sensor 110, and be provided with the first computing device 120 having a display 121, the first computing device in communication (e.g., wired or wireless communication) with the brainwave sensor 110. During a duration in which the student 101 views (learns) the current knowledge item on the display 121, the brainwave sensor 110 may collect brainwave signals of the student 101 in real time, and transmit the brainwave signals collected to the first computing device 120 through a communication link (such as Bluetooth). The first computing device 120 may preprocess the brainwave signals received, and transmit the preprocessed brainwave signals to the second computing device 130 through the network 140. The second computing device 130 may determine, based on the preprocessed brainwave signals received, the proficiency of the student 101 in the current knowledge item, and determine from the proficiency the knowledge item that the student 101 needs to learn next. The second computing device 130 may transmit the proficiency of the student 101 in the current knowledge item and the knowledge item that the student 101 needs to learn next to the first computing device 120 through the network 140.

Figure 1B:
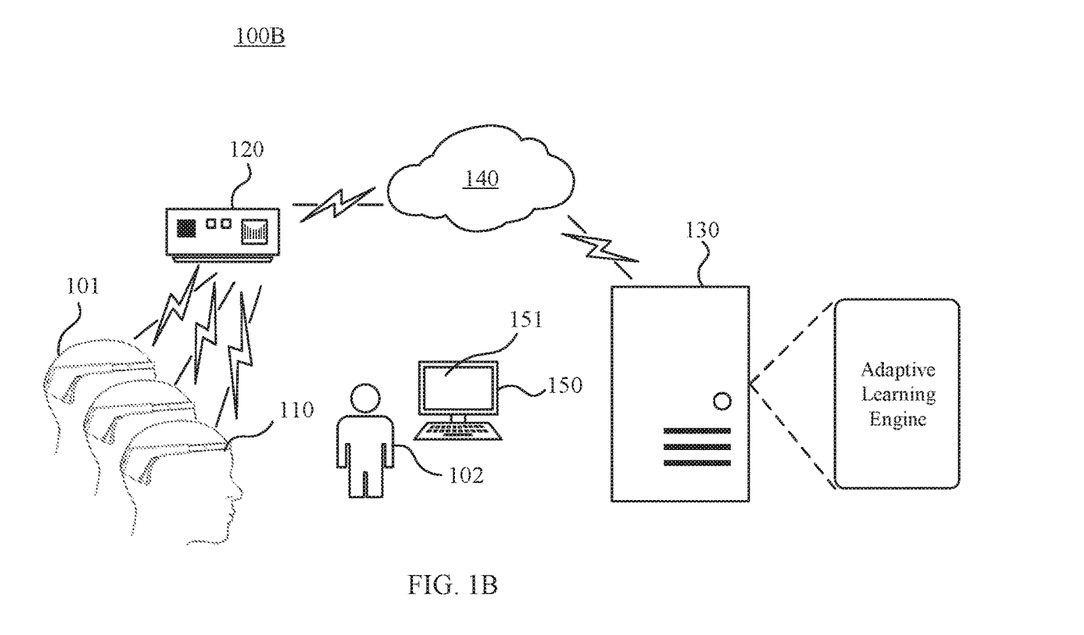
FIG. 1B is a schematic diagram illustrating an exemplary environment in which various technologies described herein can be implemented according to some other exemplary embodiments of the present disclosure.

FIG. 1B is a schematic diagram illustrating an exemplary environment 100B in which various technologies described herein can be implemented according to some other exemplary embodiments of the present disclosure. As illustrated in FIG. 1B, the environment 100B includes multiple first users 101, a second user 102, multiple brainwave sensors 110, a first computing device 120, a second computing device 130, a network 140, and a console 150.

In the scenario illustrated in FIG. 1B, the multiple first users 101 may be students in a classroom, each wearing a corresponding brainwave sensor 110. The second user 102 may be a teacher who is provided with the console 150. While the teacher 102 presents (e.g., writing on a blackboard) a knowledge item, the brainwave sensors 110 may collect brainwave signals of respective students 101 in real time, and transmit the brainwave signals collected to the second computing device 130 through the first computing device 120 via the network 140. The second computing device 130 may then determine, based on the brainwave signals of the respective students 101, their proficiency in the current knowledge item, and transmit indication information indicating the proficiency to the first computing device 120 through the network 140. The first computing device 120 may transmit the indication information to the console 150, and the indication information can be presented on the display 151 of the console 150, such that the teacher 102 can know the learning condition of each student 101.

In various embodiments, the brainwave sensor 110 may be any device capable of collecting brainwave signals, such as a wearable headband, to which the present disclosure is not limited. The first computing device 120 in the environment 100A and/or the console 150 in the environment 100B may be any type of mobile computing device, including a mobile computer (e.g., a Microsoft® Surface® device, a personal digital assistant (PDA), a laptop computer, a notebook computer, a tablet computer such as Apple iPad™, a netbook, etc.), a mobile phone (e.g., a cellular phone, a smartphone such as Microsoft Windows® phone, an Apple iPhone, a phone having the Google® Android™ operating system, a Palm® device, a Blackberry® device, etc.), a wearable computing device (e.g., a smart watch, a head-mounted device including a smart glass such as Google® Glass™, etc.), or other types of mobile devices. In alternative embodiments, the first computing device 120 and/or the console 150 may also be a fixed computing device. In the environment 100B, the first computing device 120 may be, for example, a customized router or a small server, and the present disclosure is not limited thereto. In either of the environments 100A and 100B, the second computing device 130 may be, for example, a server or a cluster of servers having a large number of computing and storage resources, and other embodiments are also possible. As will be described below, the first computing device 120 may be configured to interact with the second computing device 130, such as sending a request to the second computing device 130 and/or receiving data from the second computing device 130.

Each of the brainwave sensor 110, the first computing device 120, and the second computing device 130 may include at least one communication interface (not shown) capable of communicating through the network 140. The communication interface may include one or more of any type of network interface (e.g., a network interface card (NIC)), a wired or wireless interface (e.g., a wireless local area network (WLAN) IEEE 802.11), a world interoperability for microwave access (Wi-MAX) interface, an Ethernet interface, a universal serial bus (USB) interface, a cellular network interface, a Bluetooth™ interface, a near field communication (NFC) interface, etc. Additional examples of the communication interface will be described elsewhere in the present disclosure. Examples of the network 140 include a LAN, a wide area network (WAN), a personal area network (PAN), and/or a combination of communication networks such as the Internet.

Figure 2:
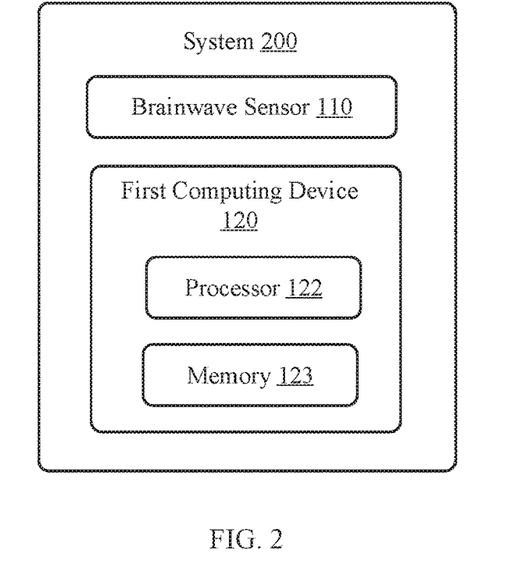
FIG. 2 is a schematic diagram illustrating a system for processing brainwave signals according to some exemplary embodiments of the present disclosure.

In various embodiments, the environment 100A illustrated in FIG. 1A and the environment 100B illustrated in FIG. 1B may be configured in various ways to achieve processing of the brainwave signals. In an example, FIG. 2 illustrates a schematic diagram of a system 200 according to some exemplary embodiments of the present disclosure. As illustrated in FIG. 2, the system 200 includes a brainwave sensor 110 and a first computing device 120 that communicate with each other. The first computing device 120 includes at least one processor 122 and a memory 123. The system 200 can be considered as the client-side configuration of an adaptive learning system.

In some embodiments, the memory 123 is configured to store instructions that, when executed by the at least one processor 122 of the first computing system, cause the first computing system to perform corresponding operations. The operations may include: acquiring brainwave signals of the user 101 collected by the brainwave sensor 110 within a duration in which the user 101 (e.g., see FIG. 1A or FIG. 1B) is viewing a first content item; preprocessing the acquired brainwave signals; initiating transmission of the preprocessed brainwave signals to a second computing device 130; and receiving, from the second computing device 130, content item recommendation information. In some examples, the content item recommendation information is obtained by the second computing device 130 by analyzing the preprocessed brainwave signals. The content item recommendation information includes a first indication (e.g., a score) of the user's proficiency in the first content item and a second indication (e.g., a second content item itself or a code of the second content item) of a second content item as a recommendation to the user 101. In an example, the code of the second content item may be an index number of the content item whereby the user 101 may find the second content item in a content item system (e.g., a textbook).

Figure 3:
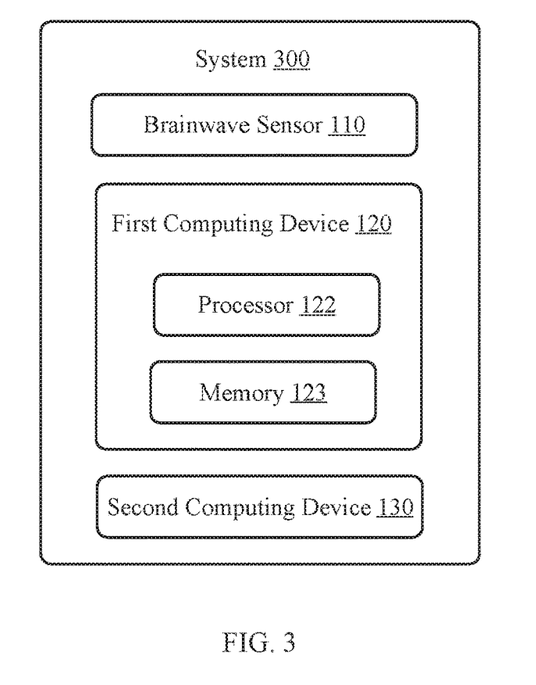
FIG. 3 is a schematic diagram illustrating a system for processing brainwave signals according to some other exemplary embodiments of the present disclosure.

FIG. 3 is a schematic diagram illustrating an adaptive learning system 300 according to some exemplary embodiments of the present disclosure. As illustrated in FIG. 3, the system 300 includes a brainwave sensor 110, a first computing device 120 and a second computing device 130. The details of the first computing device 120 may be similar to those described above with respect to FIG. 2. The second computing device 130 may also include at least one processor and a memory (not shown). In some embodiments, the second computing device 130 may be configured to: extract, from the preprocessed brainwave signals received from the first computing device 120, brainwave data corresponding to a selected time period; determine, based on the brainwave data, a brainwave state value indicative of brain activeness of the user 101 during the evaluation of his/her proficiency in a first content item; and determine the content item recommendation information based, at least in part, on the brainwave state value and the first content item. Some or all of the functions of the second computing device 130 may be implemented by an adaptive learning engine, which will be described below in detail.

In some embodiments, the selected time period may be defined by a start time at which the second computing device 130 initiates the evaluation of the user's proficiency in the first content item and an end time at which the first computing device 120 initiates completion of the evaluation, as will be further explained below. This is based on the consideration that the brainwave data of the user 101 in a non-evaluation time period is excluded, such that the data employed can truly reflect the brain activeness of the user 101 during the evaluation. This may lead to improved data quality, reduced computation load, and thus improved efficiencies in computation.

Figure 4:
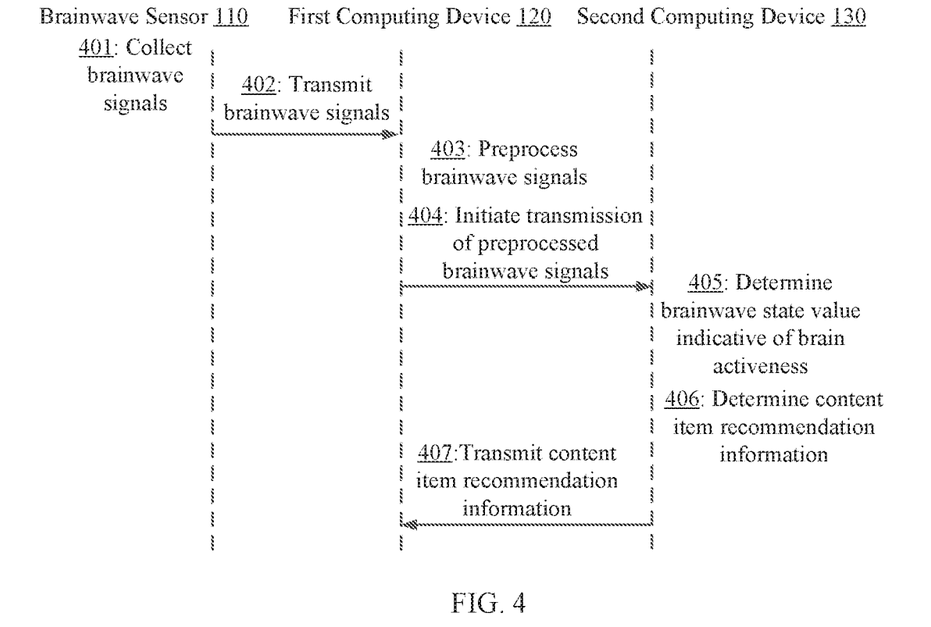
FIG. 4 is a schematic diagram illustrating an interaction between a brainwave sensor, a first computing device, and a second computing device according to some exemplary embodiments of the present disclosure.

FIG. 4 is a schematic diagram illustrating an interaction between the brainwave sensor 110, the first computing device 120 and the second computing device 130 according to some exemplary embodiments of the present disclosure. As illustrated in FIG. 4, the brainwave sensor 110 may collect brainwave signals of the user 101 (step 401). For example, the brainwave sensor 110 may collect the brainwave signals of the user 101 within a duration (e.g., a time period, such as a selected time period) in which the user 101 is viewing (learning) a first content item, and send the collected brainwave signals to the first computing device 120 (step 402). The first computing device 120 may acquire the brainwave signals and store them in its memory 123 to form a brainwave data set for the user 101. The at least one processor 123 of the first computing device 120 may preprocess the acquired brainwave signals (step 403), and initiate transmission of the preprocessed brainwave signals to the second computing device 130 (step 404). The second computing device 130 may receive the preprocessed brainwave signals sent by the first computing device 120, and extract brainwave data corresponding to a selected time period from the preprocessed brainwave signals received. The second computing device 130 may determine, based on the brainwave data extracted, a brainwave state value indicative of brain activeness of the user 101 during the evaluation of his/her proficiency in the first content item (step 405). Then, the second computing device 130 may determine the content item recommendation information based, at least in part, on the brainwave state value and the first content item. The second computing device 130 may send the content item recommendation information to the first computing device 120 (step 407). The first computing device 120 may receive the content item recommendation information for presentation on the display 121 or 151.

In some embodiments, each of the first content item and the second content item may refer to a set of questions. The questions may include any type of questions, such as blank-filling questions, multiple-choice questions, quiz questions, and optionally knowledge items (e.g., text materials that need to be recited by the user 101) related to the questions, and the like. In some examples, the first computing device 120 may directly acquire the brainwave signals from the brainwave sensor 110. In some other examples, the first computing device 120 may alternatively acquire the brainwave signals from a memory or a cache. As used herein, the phrase "an entity A initiating an action B" may refer to that the entity A issues an instruction to perform the action B, while the entity A itself does not perform the action B. For example, the processor 123 initiating transmission of the brainwave signals may refer to that the processor 123 issues an instruction to perform the transmission of the brainwave signals, with the transmission actually being performed by a communication interface (not shown).

In some embodiments, the selected time period is defined by a start time at which the second computing device 130 initiates the evaluation of the proficiency of the user 101 in the first content item and an end time at which the first computing device 120 initiates completion of the evaluation. For example, when starting to evaluate the proficiency of the user 101 in a content item, the second computing device 130 may issue an instruction (e.g., now start answering the questions) to the first computing device 120, transmit the questions corresponding to the content item to the first computing device 120, and record the current time as the start time. Then, a prompt message such as "start" may be displayed on the display 121 or 151, instructing the user 101 to start answering (i.e., accepting or beginning the evaluation). After completing the questions (i.e., completing the evaluation), the user 101 may enter a command on the first computing device 120, or the user 102 may enter a command on the console 150, and the command may be sent to the second computing device 130 via the first computing device 120, triggering the second computing device 130 to end the evaluation. The second computing device 130 may record the time when the command is received as the end time. By defining the selected time period, the brainwave signals of the user 101 only during the evaluation are acquired, and the brainwave signals of the user 101 collected by the brainwave sensor 110 before or after the evaluation are excluded, such that the learning level of the user 101 can be accurately evaluated.

In some embodiments, before the brainwave signals are acquired (specifically, before step 401), the at least one processor 123 of the first computing device 120 may initiate presentation of the first content item to the user 101. For example, in the environment 100A illustrated in FIG. 1A, the first content item may be directly presented on the display 121 of the first computing device 120. In the environment 100B illustrated in FIG. 1B, the first computing device 120 may send a command to the console 150 to present a prompt message on the display 151, prompting the user 102 to start presenting the first content item. Then, in response, the user 102 may present the first content item to the user 101 through blackboard writing or other forms of communication.

In some embodiments, in response to receipt of the content item recommendation information from the second computing device 130, the at least one processor 121 of the first computing device 120 may further initiate presentation of the first indication (e.g., the score of the user 101 on the first content item) and the second indication (e.g., the second content item itself or a code of the second content item) on the display 121 or 151. For example, in the environment 100A illustrated in FIG. 1A, the first indication and the second indication may be presented directly on the display 121 of the first computing device 120. In the environment 100B illustrated in FIG. 1B, the first computing device 120 may send the received first and second indications to the console 150 to present the first indication and the second indication on the display 151 of the console 150. This allows the user 101 or 102 to have a knowledge of the proficiency of the user 101 in the currently learned content items, and the content items that may need to be further studied or learned.

The brainwave signals collected by the brainwave sensor 110 may include an $\alpha$ wave, a $\beta$ wave, a $\theta$ wave, and a $\delta$ wave. The $\alpha$ wave has an oscillation frequency of about 8 Hz to 13 Hz, and is a brainwave that appears when the brain is in a relaxed state where the user is concentrated and not prone to distraction by external things. The $\beta$ wave has an oscillation frequency of about 14 Hz to 40 Hz or higher, and is a brainwave that appears when the brain is in a tension state where the brain is sensitive to the surroundings, hard to concentrate, and easily fatigued. The $\theta$ wave has an oscillation frequency of about 4 Hz to 7 Hz, and is a brainwave that appears when the brain is in an early stage of sleep. The $\delta$ wave has an oscillation frequency of about 0.5 Hz to 4 Hz, and is a brainwave that appears when the brain is in deep sleep. For learning tasks, the $\alpha$ wave may be considered positive because it indicates that the user is in a state of concentration. The $\beta$ wave, the $\theta$ wave, and the $\delta$ wave may be considered negative because they indicate that the user is in a state of inattention or drowsiness.

After the brainwave signals are acquired, the first computing device 120 may preprocess the brainwave signals. For example, in some embodiments, the first computing device 120 may determine, at predetermined time intervals, respective mean amplitudes of the $\delta$ wave, the $\alpha$ wave, the $\beta$ wave and the $\theta$ wave in each of the predetermined time intervals, and pad (e.g., add, insert, or store) values corresponding to respective mean amplitudes into respective different digits or fields of a brainwave data packet that corresponds to the predetermined time interval, thus obtaining multiple (e.g., a sequence of) brainwave data packets corresponding to respective ones of the predetermined time intervals. In some examples, the mean value of each of the $\delta$ wave, the $\alpha$ wave, the $\beta$ wave and the $\theta$ wave may be calculated every 15 seconds. Then, for each time interval of 15 seconds, a brainwave data value may be calculated, which may be expressed as: Brainwave data value=$\delta$-wave mean value×1000000+$\alpha$-wave mean value×10000+$\beta$-wave mean value×100+$\theta$-wave mean value. Each brainwave data value may form a corresponding brainwave data packet, with the mean value of each of the $\delta$ wave, the $\alpha$ wave, the $\beta$ wave and the $\theta$ wave, or a subset thereof, occupying two digits (decimal) of a value in the brainwave data packet. Alternatively or equivalently, the mean value of each of the $\delta$ wave, the $\alpha$ wave, the $\beta$ wave and the $\theta$ wave, or a subset thereof are stored in a distinct field in the brainwave data packet. This can facilitate data processing at the receiving side.

Each brainwave data packet may include a header (metadata) and a payload (the brainwave data value(s)). In some embodiments, the first computing device 120 may add a respective timestamp to both the header and the payload of each of the multiple brainwave data packets, and encrypt the payload, including the added timestamp (e.g., by using a message digest algorithm MD5), such that the brainwave data packet includes an unencrypted version of the timestamp in the header and an encrypted version of the timestamp in the payload. In some examples, an unencrypted timestamp may be added to the header of the brainwave data packet, and an encrypted timestamp may be added to the payload of the brainwave data packet. Upon receipt of the data transmitted by the first computing device 120, the second computing device 130 may decrypt the data and compare the decrypted timestamp with the unencrypted timestamp in the packet header to check whether the data has been tampered with. This improves the security of data transmission.

In some embodiments, the brainwave state value indicative of the user's brain activeness during the evaluation may be a function of the α wave data, the β wave data, and the θ wave data. Since the δ wave appears only when the brain is in deep sleep, and the evaluation of the user is performed when the user is awake (non-deep sleep), the probability of the δ wave appearing in the user's brain during the evaluation is small or even zero. Thus, by expressing the brainwave state value as the function of only the α wave data, the β wave data, and the θ wave data, the computation can be simplified, and the computation efficiency can be improved.

In some examples, the function may be proportional to the mean value of the α wave data in the selected time period, and inversely proportional to the mean value of the β wave data and the mean value of the θ wave data in the selected time period. This comprehensively takes into account the physiological characteristics of the α wave, the β wave, and the θ wave. As mentioned above, for learning tasks, the α wave is positive (indicating that the brain is in the state of concentration), and the β wave and θ wave are negative (indicating that the brain is in the state of inattention or drowsiness). By setting the brainwave state value to be proportional to the mean value of the α wave data in the selected time period, and inversely proportional to the mean value of the β wave data and the mean value of the θ wave data in the selected time period, the brainwave state value can accurately reflect the state of the brain, thereby improving the accuracy of the adaptive learning system.

In some examples, the function of the α wave data, the β wave data and the θ wave data may be expressed as:

$$\text{brainwave state value} = c*\ln(m1)/(\ln(m2)*\ln(m3)),$$

or more generally as:

$$\text{brainwave state value} = c1 + (c2*\ln(m1))/(c3 + (c4*\ln(m2)*\ln(m3))),$$

where $c$, $c1$-$c4$ are predefined coefficient values, $m1$ represents the mean value of the α wave data in the selected time period, $m2$ represents the mean value of the β wave data in the selected time period, and $m3$ represents the mean value of the θ wave data in the selected time period. The expression of the brainwave state value here provides advantages compared to other function expressions. Firstly, by using the logarithm function (e.g., the natural logarithm function, $\ln(\ )$) for data transformation, the absolute value of the data can be reduced, thereby simplifying computation. Moreover, by the division operation, the error can be offset, thereby further improving the accuracy of the adaptive learning system.

As described earlier, the second computing device 130 may include an adaptive learning engine. The adaptive learning engine, which may be based on machine learning models or other mathematical models, can respond to the student's interactions in real-time by automatically providing the student with personalized support. The adaptive learning engine may be pre-trained to establish a mapping from brainwave state values to content item recommendation information.

Figure 5:
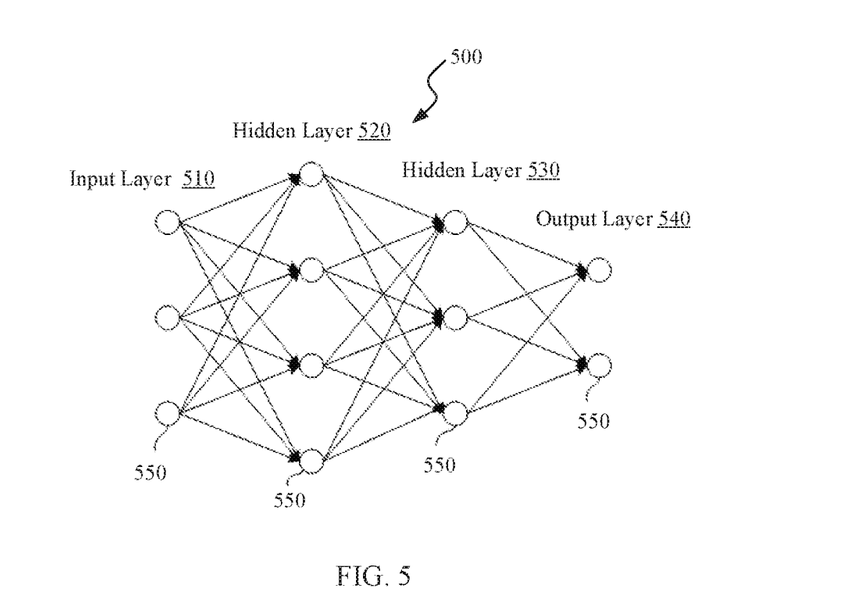
FIG. 5 is a schematic diagram illustrating a deep neural network capable of implementing an adaptive learning engine according to some exemplary embodiments of the present disclosure.

FIG. 5 is a schematic diagram illustrating a deep neural network 500 capable of implementing the adaptive learning engine according to some exemplary embodiments of the present disclosure. As illustrated in FIG. 5, the deep neural network 500 includes an input layer 510, two hidden layers 520 and 530, and an output layer 540. Each of the layers includes various nodes (also called neurons) 550. In an example, as illustrated in FIG. 5, the input layer 510 includes 3 nodes, the hidden layer 520 includes 4 nodes, the hidden layer 530 includes 3 nodes, and the output layer 540 includes 2 nodes. It should be noted that, the deep neural network 500 illustrated in FIG. 5 is merely an example, and that there may be more hidden layers and nodes in an actual deep neural network.

The input layer 510 may be configured to receive input data, such as brainwave state values, a code that identifies the knowledge item currently being learned, calibration parameters (for calibration in light of differences among individuals or groups), or the like. The data may be propagated to the hidden layer 520. Each node in the hidden layer 520 may process the data received, and propagate the processing result to the next hidden layer 530. Similarly, each node in the hidden layer 530 may process the data received from the hider layer 520, and propagate the processing result to the output layer 540. The output layer 540 may process the data received, and output the result, such as the content item recommendation information including the first indication and the second indication, as described above.

The nodes in the layers may be fully connected or partially connected. For full connection, any node in a current layer (e.g., the output layer 540) may be connected to all nodes in its adjacent previous layer (e.g., the hidden layer 530). For partial connection, one or more nodes in the current layer (e.g., the output layer 540) may only be connected to some nodes, instead of all nodes, in its adjacent previous layer (e.g., the hidden layer 530). In the neural network 500 illustrated in FIG. 5, the nodes are fully connected. It can be understood that at least some layers in the deep neural network 500 may alternatively be partially connected.

After a period of learning, the user may have or may have not mastered the currently learned first content item. After the user's proficiency in the currently learned content item is acquired (e.g., determined), a corresponding content item may be recommended to the user based on the proficiency. In some examples, the adaptive learning engine may, based at least in part on the user's brainwave state value and the code of the currently learned first content item, acquire (e.g., determine) the user's proficiency in the first content item and the second content item recommended to the user for further learning.

The adaptive learning engine may include a first subsystem and a second subsystem. The first subsystem may be configured to determine the user's proficiency in the currently learned content item, and the second subsystem may be configured to determine the content item recommended to the user for further learning. The rationale underlying the first subsystem and the second subsystem may include, for example, knowledge space theory, item response theory (IRT), and probabilistic graphical theory.

In some embodiments, the first subsystem may determine the user's proficiency in the currently learned content item based on the IRT. The IRT establishes a nonlinear model between student response and question parameters and ability levels, and selects the next question by using a maximum information method, which can achieve the desired measurement accuracy with fewer questions. In some examples, a mathematical expression of a three-parameter logistic model of the IRT may be expressed as:

$$P_g(\theta) = c_g + \frac{1 - c_g}{1 + e^{-Da_g(\theta - b_g)}},$$

where D is a constant of 1.702, $c_g$ is the guessing coefficient of the question g, $b_g$ is the difficulty of the question g, and $a_g$ is the discrimination degree of the question g. This model may represent the probability, $P_g(\theta)$, that a student having an ability θ can correctly answer the question g. The parameters $a_g$, $b_g$, $c_g$ may be acquired in advance by using maximum likelihood estimation. The quality of the question is generally expressed by an information function, $I_g(\theta)$:

$$I_g(\theta) = \frac{(P'_g(\theta))^2}{P_g(\theta)(1 - P_g(\theta))},$$

where $P'_g(\theta)$ is the slope or first-order derivative of the probability $P_g(\theta)$ at the ability θ. The greater the value of the information function is, the higher the quality of the question in a specific context is. The information function of the three-parameter logistic model may be expressed as:

$$I_g(\theta) = \frac{D^2 a_g^2 (1 - c_g)}{(c_g + e^{Da_g(\theta - b_g)})(1 + e^{-Da_g(\theta - b_g)})^2}.$$

In an example, based on the three-parameter logistic model and the information function of the three-parameter logistic model described above, an adaptive testing process may include: (1) establishing a question library of the tested content, marking (e.g., determining and storing values representing) the difficulty, the discrimination degree and the guessing coefficient of each question in the question library; (2) when a student completes a question, calculating the score of the student based on the brainwave data information of the student, estimating the student's potential trait θ according to the score, and selecting, according to the potential trait θ, a question that maximizes the information function $I_g(\theta)$ from the topic library as the next question; and (3) when the potential trait θ tends to be stable or swings (e.g., varies) within a preset range, ending the test, and determining the value of the potential trait θ as a representation of the student's proficiency in the question or the content item.

In combination with the user's brainwave state in the testing process and the IRT, the adaptive learning engine can determine the user's proficiency in the currently learned content item. Since the brainwave can truly reflect the user's physiological state during the learning or testing process, the test result can truly reflect the user's learning level, thereby improving the accuracy of the algorithm.

In some embodiments, the second subsystem may determine the content item recommended to the user for further learning based on the knowledge space theory. The knowledge space theory was proposed by Doignon and Falmagne in 1999. The core concept of the knowledge space theory is knowledge space. The knowledge space is a knowledge structure closed to set union operations, and is constrained by the premise relationship between the questions. The premise relationship between the questions may be determined in advance, for example, by experts in the field. In the knowledge space theory, the neighbors of a knowledge state (an element in the knowledge space, which is a set) k1 may be defined as a set of knowledge states whose distance from the knowledge state k1 is less than or equal to 1. The distance between two knowledge states may be defined as the magnitude of their set symmetric difference. The symmetric difference between two sets is a set including elements belonging to only one of the two sets and not belonging to the other of the two sets. For example, for a set A={x, y, z, k} and a set B={x, y, h, t}, where elements x and y belong to both set A and set B, and elements z, k, h, t belong to only one of set A and B, the symmetric difference between set A and set B may be expressed as: AΔB={z, k, h, t}.

Figure 6:
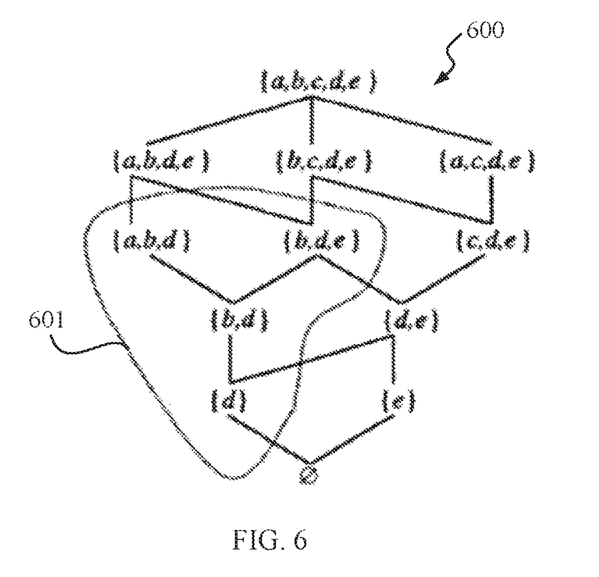
FIG. 6 is a schematic diagram illustrating an exemplary Hasse graph of the knowledge space theory underlying an adaptive learning engine according to some exemplary embodiments of the present disclosure.

FIG. 6 is a schematic diagram illustrating a Hasse graph of an exemplary knowledge space 600. In this example, for a knowledge domain Q={a, b, c, d, e} that includes 5 questions, the premise relationships between these questions include: (1) if a student can solve question a, the student can solve at least one of its premise questions b or c; (2) if the student can solve question b, the student can solve its premise question d; and (3) if the student can solve question c, the student can solve its premise questions d and e. Then, the knowledge space K of the knowledge domain Q may be expressed as: K={ø, {d}, {e}, {b, d}, {d, e}, {a, b, d}, {b, d, e}, {c, d, e}, {a, b, d, e}, {b, c, d, e}, {a, c, d, e}, Q}. In the example of FIG. 6, the set of the neighbors of the knowledge state {b, d} may be expressed as: N({b, d})={{d}, {b, d}, {a, b, d}, {b, d, e}}, as indicated by curve 601.

In some circumstances, the first indication (e.g., the score) may be indicative that the user's proficiency in the first content item is greater than or equal to a first threshold, meaning that the user 101 has mastered the first content item. In this case (e.g., in accordance with a determination that the first indication is indicative that the user's proficiency in the first content item is greater than or equal to the first threshold), the second content item recommended to the user 101 is different from the first content item, such that the user 101 can learn a new second content item. In an example, the first content item and the second content item may be neighbor content items to an extent that the first and second content items satisfy a neighbor criterion. The neighbor criterion includes a set symmetric difference between the first content item and the second content item being less than or equal to a second threshold. This means that the second content item is closely related to the first content item, allowing the user 101 to make progress gradually along a smooth learning curve.

In some circumstances, the first indication indicative of the user's proficiency in the first content item may, however, be less than the first threshold, meaning that the user 101 has not mastered the first content item. In this case (e.g., in accordance with a determination that the first indication is indicative that the user's proficiency in the first content item is less than the first threshold), the first content item and the second content item are the same content item. In other words, when the user 101 does not master the first content item, the second content item recommended to the user 101 may be the same as the first content item.

Figure 7:
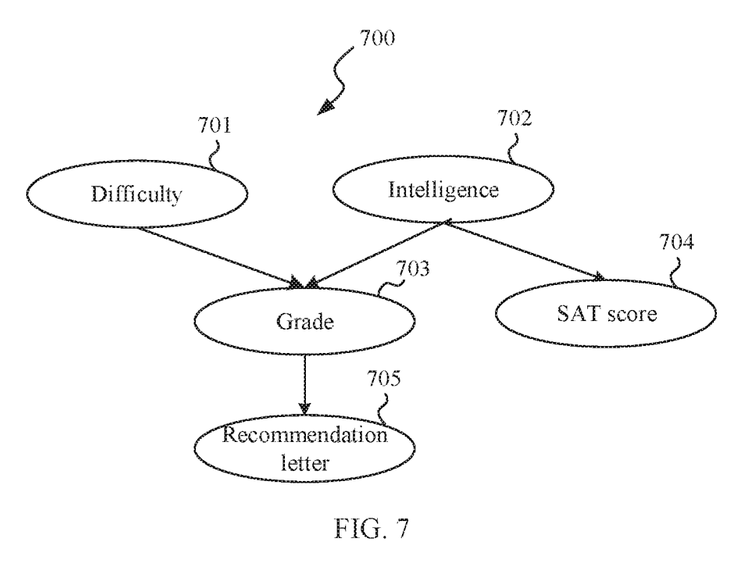
FIG. 7 is a schematic diagram illustrating an exemplary Bayesian network underlying an adaptive learning engine according to some exemplary embodiments of the present disclosure.

In some embodiments, the second subsystem may determine the content item recommended to the user 101 for further learning based on the probabilistic graphical theory. Probabilistic graphical model is a theory that represents probability dependency by using graphs. A basic probabilistic graphical model includes a Bayesian network. The Bayesian network takes the form of a directed acyclic graph. The directed acyclic graph includes nodes and edges, with the nodes denoting random variables, and the edges denoting the dependency between the nodes.

FIG. 7 is a schematic diagram illustrating an exemplary Bayesian network 700. In this example, a student may have variables such as difficulty 701, intelligence 702, grade 703, SAT (scholastic assessment test) score 704, and recommendation letter 705. The grade 703 may be determined by the difficulty 701 and the intelligence 702, the SAT score 704 may be determined by the intelligence 702, and the recommendation letter 705 may be determined by the grade 703. The relationship between these variables may be expressed by a directed acyclic graph, as illustrated in FIG. 7. The second subsystem may, based on the probabilistic graphical theory, analyze the user's proficiency in the currently learned content item, and determine the content item for the user 101 to learn next.

In an example, a Bayesian network model may be adopted, in which each knowledge item may be denoted by a node, and each node may correspond to a value. The value on a learned knowledge item (a node) is the user's proficiency determined based on the brainwave data information, and the value on an unlearned knowledge item (a node) is a value for evaluating whether the unlearned knowledge item is suitable for learning. By training the Bayesian network model, when the proficiency in the learned knowledge item changes, the Bayesian network model may automatically update the values on the unlearned knowledge items. When the value on an unlearned knowledge item reaches a preset threshold, the unlearned knowledge item may then be unlocked, allowing the user to learn it.

In other embodiments, in the process of recommending the user to learn further content items, a content item that has been mastered may be recommended to the user 101 again, considering the user's forgetfulness of the content item mastered. For example, a forgetting curve may be introduced, based on which it is determined that related knowledge to a certain content item may be recommended to the user 101 again after the user learns that content item for a certain time.

In various embodiments, since the determination of the user's proficiency in the currently learned content item takes into account the user's physiological characteristics (e.g., brainwave signals) during the learning process, the content item recommendation information determined may accurately reflect and adapt to the user's current learning level. This helps avoid situations where the recommended content items are so easy or difficult as to cause user pride or frustration, thereby improving the user experience.

Figure 8:
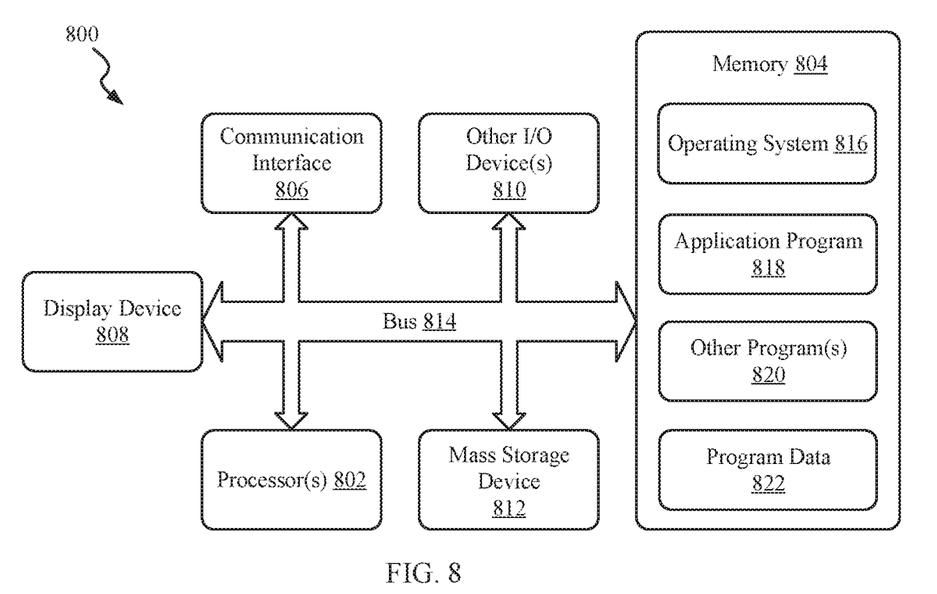
FIG. 8 is a schematic diagram illustrating a computing device configured for implementing functions described herein according to some exemplary embodiments of the present disclosure.

FIG. 8 is a schematic diagram illustrating an exemplary configuration of a computing device 800 configured for implementing functions described herein. For example, the first computing device 120 and/or the second computing device 130 may include an architecture similar to the computing device 800.

The computing device 800 may any of a variety of types of devices, such as a server of a service provider, a device associated with a client (e.g., client device), a system on a chip, and/or any other suitable computing device or computing system. Examples of the computing device 800 include, but are not limited to, desktop computers, server computers, notebook or netbook computers, mobile devices (e.g., tablet or phablet devices, cellular or other wireless phones (e.g., smart phones), notepad computers, mobile stations), wearable devices (e.g., glasses, watches), entertainment devices (e.g., entertainment appliances, set-top boxes communicatively coupled to display devices, game consoles), televisions or other display devices, automotive computers, etc. Thus, the computing device 800 may range from full resource devices (e.g., personal computers, game consoles) with large amounts of memory and processor resources to low resource devices (e.g., traditional set-top boxes, handheld game consoles) with limited memory and/or processor resources.

The computing device 800 may include at least one processor 802, memory 804, communication interface(s) 806, a display device 808, optionally other input/output (I/O) devices 810, and one or more mass storage devices 812, able to communicate with each other, such as via a system bus 814 or other suitable connection.

The processor 802 may be a single processing unit or a number of processing units, all of which may include a single or multiple computing units or multiple cores. The processor 802 may be implemented as one or more microprocessors, microcomputers, microcontrollers, digital signal processors, central processing units, state machines, logic circuitries, and/or any devices that manipulate signals based on operational instructions. Among other capabilities, the processor 802 may be configured to acquire and execute computer-readable instructions stored in the memory 804, the mass storage device 812, or other computer-readable media. Examples of the computer-readable instructions may include program code of an operating system 816, program code of an application program 818, program code of other programs 820, and the like.

Memory 804 and mass storage device 812 are examples of computer storage media for storing instructions. The instructions may be executed by the processor 802 to implement various functions described above. For example, memory 804 may generally include both volatile memory and non-volatile memory (e.g., random access memory (RAM), read only memory (ROM), etc.). In addition, mass storage device 812 may generally include hard disk drives, solid-state drives, removable media, including external and removable drives, memory cards, flash memory, floppy disks, optical disks (such as CDs, DVDs), a storage array, a network attached storage, a storage area network, or the like. Both memory 804 and mass storage device 812 may be collectively referred to herein as memory or computer storage medium, and may be a non-transitory medium capable of storing (e.g., in one or more programs) computer-readable, processor-executable program instructions as computer program code. The computer program code may be executed by the processor 802 of a particular machine (e.g., computing device 800) configured for carrying out the operations and functions described in the examples herein.

Multiple program modules may be stored on the mass storage device 812. These programs include an operating system 816, one or more application programs 818, other programs 820, and program data 822, and they can be loaded into the memory 804 for execution. Examples of the application programs or program modules may include, for example, computer program logic (e.g., computer program code or instructions) for implementing related components/functions, and/or additional embodiments described herein.

Although illustrated in FIG. 8 as being stored in memory 804 of computing device 800, the modules 816, 818, 820, and 822, or portions thereof, may be implemented using any form of computer-readable media accessible by computing device 800. As used herein, "computer-readable media" includes, at least, two types of computer-readable media, namely computer storage media and communications media.

Computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media can embody computer readable instructions, data structures, program modules, or other data in a modulated data signal, such as a carrier wave, or other transmission mechanism. As defined herein, computer storage media does not include communication media.

In some embodiments, computing device 800 includes one or more communication interface(s) 806 for exchanging data with other devices, such as via a network, direct connection, or the like, as discussed above. The communication interface(s) 806 may include one or more of: any type of network interface (e.g., NIC), a wired or wireless interface (e.g., WLAN IEEE 802.11), Wi-MAX interface, Ethernet interface, USB interface, cellular network interface, Bluetooth™ interface, NFC interface, etc. The communication interface(s) 806 can facilitate communications within a wide variety of networks and protocol types, including wired networks (e.g., LAN, cable, etc.) and wireless networks (e.g., WLAN, cellular, satellite, etc.), the Internet and the like. Communication interface(s) 806 can also provide communication with external storage (not shown), such as in a storage array, network attached storage, storage area network, or the like.

A display device 808, such as a monitor can be included in some examples of computing device 800 for displaying information and images to users. Other I/O devices 810 may be devices that receive various inputs from a user and provide various outputs to the user, and can include a touch input device, a gesture input device, a camera, a keyboard, a remote controller, a mouse, a printer, audio input/output devices, and so forth.

Although the present disclosure has been explained and described in detail in the accompanying drawings and the foregoing description, such explanation and description are illustrative and schematic, rather than restrictive. The present disclosure is not limited to the disclosed embodiments. Variations to the disclosed embodiments can be understood and effected by the skilled person in practicing the claimed subject matter, from a study of the drawings, the disclosure, and the appended claims. In the claims, the word "comprises" or "comprising" does not exclude other elements or steps, the indefinite article "a" or "an" does not exclude a plurality, and the term "a plurality of" may refer to two or more. The mere fact that certain measures are recited in mutually different dependent claims does not indicate that a combination of these measures cannot be used to advantage.

What is claimed is:

1. A system for processing brainwave signals, comprising:
a first computing device comprising at least one processor and a memory storing instructions; and
a brainwave sensor in communication with the first computing device,
wherein the instructions, in response to execution by the at least one processor, cause the at least one processor to perform operations comprising:
acquiring brainwave signals of a user collected by the brainwave sensor within a duration in which the user is viewing a first content item;
preprocessing the acquired brainwave signals;
initiating transmission of the preprocessed brainwave signals to a second computing device; and
receiving, from the second computing device, content item recommendation information obtained by the second computing device analyzing the preprocessed brainwave signals, wherein the content item recommendation information comprises a first indication of the user's proficiency in the first content item and a second indication of a second content item as a recommendation to the user,
wherein, in accordance with a determination that the first indication is indicative that the user's proficiency in the first content item is greater than or equal to a first threshold, the first content item and the second content item are different content items and are neighbor content items to an extent that the first content item and second content item satisfy a neighbor criterion, which comprises a set symmetric difference between the first content item and the second content item being less than or equal to a second threshold.

2. The system of claim 1, wherein, in accordance with a determination that the first indication is indicative that the user's proficiency in the first content item is less than a first threshold, the first content item and the second content item are a same content item.

3. The system of claim 1, further comprising the second computing device, wherein the second computing device is configured to:
extract, from the preprocessed brainwave signals received from the first computing device, brainwave data corresponding to a selected time period, wherein the selected time period is defined by a start time at which the second computing device initiates evaluation of the user's proficiency in the first content item and an end time at which the first computing device initiates completion of the evaluation;
determine, based on the brainwave data, a brainwave state value indicative of the user's brain activeness during the evaluation; and
determine the content item recommendation information based, at least in part, on the brainwave state value and the first content item.

4. The system of claim 3, wherein the brainwave data comprises α wave data, β wave data, and θ wave data, and wherein the brainwave state value is a function of the α wave data, the β wave data, and the θ wave data.

5. The system of claim 4, wherein the function is proportional to a mean value of the α wave data in the selected time period, and is inversely proportional to a mean value of the β wave data in the selected time period and a mean value of the θ wave data in the selected time period.

6. The system of claim 5, wherein the function is:

the brainwave state value=$\ln(m1)/(\ln(m2)*\ln(m3))$, wherein m1 represents the mean value of the α wave data in the selected time period, m2 represents the mean value of the β wave data in the selected time period, and m3 represents the mean value of the θ wave data in the selected time period.

7. The system of claim 3, wherein the second computing device comprises an adaptive learning engine pre-trained to establish a mapping from brainwave state values to content item recommendation information.

8. The system of claim 1, wherein the brainwave signals comprise a δ wave, an α wave, a β wave, and a θ wave, and wherein the preprocessing comprises:

determining, at predetermined time intervals, respective mean amplitudes of the δ wave, the α wave, the β wave and the θ wave in each predetermined time interval of the predetermined time intervals; and storing values corresponding to the respective mean amplitudes in respective different digits or fields of a brainwave data packet that corresponds to the predetermined time interval, to obtain a plurality of brainwave data packets corresponding to respective ones of the predetermined time intervals.

9. The system of claim 8, wherein the preprocessing further comprises:

adding a respective timestamp to both a header and a payload of each brainwave data packet of the plurality of brainwave data packets; and encrypting the payload added with the timestamp, such that the brainwave data packet comprises an unencrypted version of the timestamp in the header and an encrypted version of the timestamp in the payload of the brainwave data packet.

10. The system of claim 1, wherein the operations further comprise, prior to acquiring the brainwave signals:

initiating presentation of the first content item to the user.

11. The system of claim 1, wherein the operations further comprise:

initiating presentation of the first indication and the second indication on a display in response to receipt of the content item recommendation information.

12. The system of claim 1, wherein the brainwave sensor comprises a wearable headband.

13. A computing device, comprising:

at least one processor; and a memory storing instructions executable by the at least one processor, wherein the instructions comprise:

instructions to extract, from brainwave signals received from a further computing device, brainwave data corresponding to a selected time period, wherein the brainwave signals are collected by a brainwave sensor associated with the further computing device within a duration in which a user is viewing a first content item, and wherein the selected time period is defined by a start time at which the computing device initiates evaluation of the user's proficiency in the first content item and an end time at which the further computing device initiates completion of the evaluation;

instructions to determine, from the brainwave data, a brainwave state value indicative of the user's brain activeness during the evaluation; and instructions to determine the content item recommendation information based, at least in part, on the brainwave state value and the first content item, wherein the content item recommendation information comprises a first indication of the user's proficiency in the first content item and a second indication of a second content item as a recommendation to the user;

and wherein, in accordance with a determination that the first indication is indicative that the user's proficiency in the first content item is greater than or equal to a first threshold, the first content item and the second content item are different content items and are neighbor content items to an extent that the first content item and second content item satisfy a neighbor criterion, which comprises a set symmetric difference between the first content item and the second content item being less than or equal to a second threshold.

14. The computing device of claim 13, wherein the brainwave data comprises α wave data, β wave data, and θ wave data, and wherein the brainwave state value is a function of the α wave data, the β wave data, and the θ wave data.

15. The computing device of claim 14, wherein the function is proportional to a mean value of the α wave data in the selected time period, and is inversely proportional to a mean value of the β wave data in the selected time period and a mean value of the θ wave data in the selected time period.

16. The computing device of claim 15, wherein the function is:

the brainwave state value=$\ln(m1)/(\ln(m2)*\ln(m3))$, wherein m1 represents the mean value of the α wave data in the selected time period, m2 represents the mean value of the β wave data in the selected time period, and m3 represents the mean value of the θ wave data in the selected time period.

17. The computing device of claim 13, wherein the instructions to determine the content item recommendation information comprise instructions to implement an adaptive learning engine pre-trained to establish a mapping from brainwave state values to content item recommendation information.

18. A non-transitory computer-readable storage medium having stored thereon instructions that, in response to execution by at least one processor, cause the at least one processor to perform operations comprising:

acquiring brainwave signals of a user collected by a brainwave sensor within a duration in which the user is viewing a first content item;

preprocessing the acquired brainwave signals;

initiating transmission of the preprocessed brainwave signals to a second computing device; and receiving, from the second computing device, content item recommendation information obtained by the second computing device analyzing the preprocessed brainwave signals, wherein the content item recommendation information comprises a first indication of the user's proficiency in the first content item and a second indication of a second content item as a recommendation to the user;

wherein, in accordance with a determination that the first indication is indicative that the user's proficiency in the first content item is greater than or equal to a first threshold, the first content item and the second content item are different content items and are neighbor content items to an extent that the first content item and second content item satisfy a neighbor criterion, which comprises a set symmetric difference between the first content item and the second content item being less than or equal to a second threshold.

* * * * *